(12) United States Patent
Wilson

(10) Patent No.: US 6,988,305 B1
(45) Date of Patent: Jan. 24, 2006

(54) METHOD AND APPARATUS FOR BLOW MOLDING LARGE REINFORCED PLASTIC PARTS

(75) Inventor: Phillip S. Wilson, Commerce Township, MI (US)

(73) Assignee: Magna International of America, Inc., Troy, MI (US)

(*) Notice: Subject to any disclaimer, the term of this patent is extended or adjusted under 35 U.S.C. 154(b) by 0 days.

(21) Appl. No.: 09/857,767

(22) PCT Filed: Dec. 17, 1999

(86) PCT No.: PCT/US99/29991

§ 371 (c)(1),
(2), (4) Date: Jun. 11, 2001

(87) PCT Pub. No.: WO00/37239

PCT Pub. Date: Jun. 29, 2000

(51) Int. Cl.
*B23P 17/00* (2006.01)
(52) U.S. Cl. ............ 29/527.1; 29/897.2; 264/540
(58) Field of Classification Search .......... 29/527.1, 29/897.2, 419.1; 264/540; 714/5, 7, 8, 13, 714/15, 27, 43, 47, 48; 717/126, 127; 710/8–10
See application file for complete search history.

(56) References Cited

U.S. PATENT DOCUMENTS

| 3,497,409 | A |   | 2/1970 | Clem |
| 4,566,407 | A | * | 1/1986 | Peter .................. 123/41.48 |
| 4,739,007 | A |   | 4/1988 | Okada et al. |
| 4,876,033 | A |   | 10/1989 | Dziula |
| 4,889,885 | A | * | 12/1989 | Usuki et al. .............. 524/445 |
| 4,945,682 | A |   | 8/1990 | Altman et al. |
| 4,995,545 | A | * | 2/1991 | Wycech .................. 228/119 |
| 5,000,333 | A | * | 3/1991 | Petrelli .................. 220/890 |
| 5,164,440 | A | * | 11/1992 | Deguchi et al. .......... 524/444 |
| 5,239,406 | A |   | 8/1993 | Lynam |
| 5,309,634 | A | * | 5/1994 | Van Order et al. ......... 29/863 |
| 5,385,776 | A | * | 1/1995 | Maxfield et al. ......... 428/297.4 |
| 5,500,179 | A | * | 3/1996 | Onishi et al. ............ 264/400 |

(Continued)

FOREIGN PATENT DOCUMENTS

CA    2142764    8/1995

(Continued)

OTHER PUBLICATIONS

Porter et al. Journal of Polymer Science: Part B: Polymer Physics—"Inorganic/Organic Host-Guest Materials: Surface and Interclay Reactions of Styrene with Cooper (II)—Exchanged Hectorite"; vol. 36, 673-679, Mar. 1998.

(Continued)

*Primary Examiner*—Essama Omgba
(74) *Attorney, Agent, or Firm*—Pillsbury Winthrop Shaw Pittman LLP

(57) ABSTRACT

A method for molding large parts, comprises the steps of providing a reinforced plastic melt comprising at least one thermoplastic material and reinforcement particles dispersed within the at least one thermoplastic material, the reinforcement particles comprising less than 15% of a total volume of the plastic melt, at least 50% of the reinforcement particles having a thickness of less than about 20 nanomenters, and at least 99% of the reinforcement particles having a thickness of less than about 30 nanometers; communicating a tubular formation of the plastic melt to a mold assembly having a mold cavity defined by mold surfaces, the mold surfaces corresponding to a configuration of the part to be molded; applying pressurized gas to an interior of the tubular formation to expand the tubular formation into conformity with the mold surfaces; and solidifying the plastic melt to form the part; and removing the part from the mold assembly.

24 Claims, 6 Drawing Sheets

U.S. PATENT DOCUMENTS

| | | | | |
|---|---|---|---|---|
| 5,527,581 | A * | 6/1996 | Sugawara et al. | 428/71 |
| 5,552,469 | A | 9/1996 | Beall et al. | |
| 5,576,372 | A | 11/1996 | Kresge et al. | |
| 5,576,373 | A | 11/1996 | Kresge et al. | |
| 5,591,289 | A | 1/1997 | Souders et al. | |
| 5,614,144 | A * | 3/1997 | Onishi et al. | 264/454 |
| 5,624,619 | A | 4/1997 | Pelzer | |
| 5,626,704 | A | 5/1997 | Bowers, Jr. et al. | |
| 5,643,998 | A | 7/1997 | Nakano et al. | |
| 5,649,587 | A * | 7/1997 | Plant | 165/41 |
| 5,652,284 | A | 7/1997 | Eidt, Jr. et al. | |
| 5,660,428 | A | 8/1997 | Catlin | |
| 5,665,183 | A | 9/1997 | Kresge et al. | |
| 5,672,397 | A | 9/1997 | Bowers, Jr. et al. | |
| 5,688,866 | A | 11/1997 | Silvis et al. | |
| 5,693,710 | A | 12/1997 | Srinivasan et al. | |
| 5,698,624 | A | 12/1997 | Beall et al. | |
| 5,705,222 | A | 1/1998 | Somasundaran et al. | |
| 5,712,003 | A | 1/1998 | Suenaga et al. | |
| 5,716,560 | A | 2/1998 | Heuchert et al. | |
| 5,717,000 | A | 2/1998 | Karande et al. | |
| 5,728,443 | A | 3/1998 | Bowers, Jr. et al. | |
| 5,728,465 | A | 3/1998 | Dorfman et al. | |
| 5,733,644 | A | 3/1998 | Tanaka et al. | |
| 5,741,860 | A | 4/1998 | Matsumoto et al. | |
| 5,743,983 | A | 4/1998 | Ogata et al. | |
| 5,747,560 | A * | 5/1998 | Christiani et al. | 523/209 |
| 5,750,062 | A | 5/1998 | Tsukamoto | |
| 5,750,600 | A | 5/1998 | Nozokido et al. | |
| 5,807,629 | A * | 9/1998 | Elspass et al. | 428/323 |
| 5,849,830 | A * | 12/1998 | Tsipursky et al. | 524/450 |
| 5,853,886 | A * | 12/1998 | Pinnavaia et al. | 428/403 |
| 5,876,812 | A * | 3/1999 | Frisk et al. | 428/35.7 |
| 5,883,173 | A | 3/1999 | Elspass et al. | |
| 5,932,634 | A * | 8/1999 | Hosokawa et al. | 523/209 |
| 5,941,329 | A * | 8/1999 | Ichioka et al. | 180/68.6 |
| 5,972,448 | A * | 10/1999 | Frisk et al. | 428/35.7 |
| 6,060,549 | A * | 5/2000 | Li et al. | 524/445 |
| 6,086,145 | A * | 7/2000 | Wandyez | 296/214 |
| 6,129,885 | A * | 10/2000 | Klein | 264/540 |
| 6,251,980 | B1 * | 6/2001 | Lan et al. | 524/445 |
| 6,260,893 | B1 * | 7/2001 | Wilson | 293/120 |
| 6,287,634 | B1 * | 9/2001 | Beall et al. | 427/220 |
| 6,287,992 | B1 * | 9/2001 | Polansky et al. | 442/59 |
| 6,299,244 | B1 * | 10/2001 | Tarahomi | 296/210 |
| 6,303,071 | B1 * | 10/2001 | Sugawara et al. | 264/526 |
| 6,337,046 | B1 * | 1/2002 | Bagrodia et al. | 264/540 |
| 6,350,804 | B2 * | 2/2002 | Adedeji et al. | 524/445 |
| 6,354,003 | B1 * | 3/2002 | Lehmann et al. | 29/897.2 |
| 6,391,449 | B1 * | 5/2002 | Lan et al. | 428/402 |
| 6,395,386 | B2 * | 5/2002 | Bagrodia et al. | 428/323 |
| 6,409,947 | B1 * | 6/2002 | Wandyez | 264/45.9 |
| 6,454,974 | B1 * | 9/2002 | Wilson | 264/46.8 |
| 6,462,122 | B1 * | 10/2002 | Qian et al. | 524/445 |
| 6,470,573 | B2 * | 10/2002 | Tarahomi | 29/897.2 |
| 6,548,587 | B1 * | 4/2003 | Bagrodia et al. | 524/445 |
| 6,558,605 | B1 * | 5/2003 | Wilson | 264/328.8 |
| 6,579,927 | B1 * | 6/2003 | Fischer | 524/445 |
| 6,586,088 | B1 * | 7/2003 | Wilson | 428/324 |
| 6,631,562 | B1 * | 10/2003 | Balzer et al. | 29/897.2 |
| 6,759,463 | B2 * | 7/2004 | Lorah et al. | 524/445 |
| 6,777,479 | B1 * | 8/2004 | Bernard et al. | 524/445 |
| 6,815,491 | B2 * | 11/2004 | Adedeji et al. | 524/504 |

FOREIGN PATENT DOCUMENTS

| | | | |
|---|---|---|---|
| CA | 2205974 | * | 5/1996 |
| EP | 0 352 042 B1 | | 3/1995 |
| EP | 0 437 096 B1 | | 9/1996 |
| EP | 0 738 580 | | 10/1996 |
| EP | 0 747 451 | | 12/1996 |
| EP | 0 810 259 | | 12/1997 |
| EP | 0 810 260 | | 12/1997 |
| JP | 410244889 A | * | 9/1998 |
| WO | WO 93/11190 | | 6/1993 |
| WO | WO 94/22680 | | 10/1994 |
| WO | WO 99/61281 | | 12/1999 |

OTHER PUBLICATIONS

Hasegawa et al. Journal of Applied Polymer Science—"Preparation and Mechanical Properties of Polypropylene—Clay Hybrids Using a Maleic Anhydride-Modified Polypropylene Oligomer"; vol. 67, 87-92, Jan. 3, 1998.

Ou et al. Journal of Polymer Science: Part B: Polymer Physics—A New Conception on the Toughness of Nylon 6/Silica Nanocomposite Prepared via In Situ Polymerization; vol. 36, 789-795, Apr. 15, 1998.

Modern Plastics, "Nanocomposites showing promise in automotive and packaging roles", Feb. 1998, pp. 26-28.

Abstract—JP9316119A: "Olefin Polymerization Catalyst and Polymerization of Olefin Using the Same".

Abstract—JP8027339A: "Heat Resistant Vinyl Chloride Resin Composition".

Abstract—JP8127089A: "Multilayered Plastic Fuel Tank".

Abstract—JP9048896A: "Vinyl Chloride-Based Resin Composition for Powder Molding".

Abstract—JP9048897A: "Vinyl Chloride-Based Resin Composition for Powder Molding".

Abstract —JP9067493A: "Chenille Under Door".

Abstract—JP9077943A: "Vinyl Chloride Resin Composition for Paste".

Abstract—JP9137019A: "Vinyl Chloride Resin Composition".

Abstract—JP 9302180A: "Vinyl Cloride Resin Composition for Powder Molding".

Abstract—JP 10060037A: "Catalyst for Polymering Olefin and Polymerization of Olefin in Presence of the Catalyst".

Abstract—JP 2029457A: "High-Rigidity and High-Impact Polyamide Resin Composition".

Abstract—JP2166157A: "Resin Composition".

Abstract—JP2208357A: "Material for Automotive Trim".

Abstract—JP2208358A: "Highly Rigid and Heat-Resistant Polyamide Resin Composition".

Abstract—JP2240160A: "Material for Part in Automotive Engine Room".

Abstract—JP3024155A: "Polyamide Blow Molding Material".

Abstract—JP3215556A: "Resin Composition".

Abstract—JP3215557A: "Resin Composition".

Abstract—JP4180965A: "Preparation of Modified Composite Material".

Abstract—JP4305444A: "Foamed Sheet Material and Preparation Thereof".

Abstract—JP5293916A: "Multilayer Fuel Tube for Automobile".

Abstract—JP63132933A: "Thermotropic Liquid Crystal Copolyester".

Abstract—JP7324160A: "Polyphenylene Ether Resin Composition".

* cited by examiner

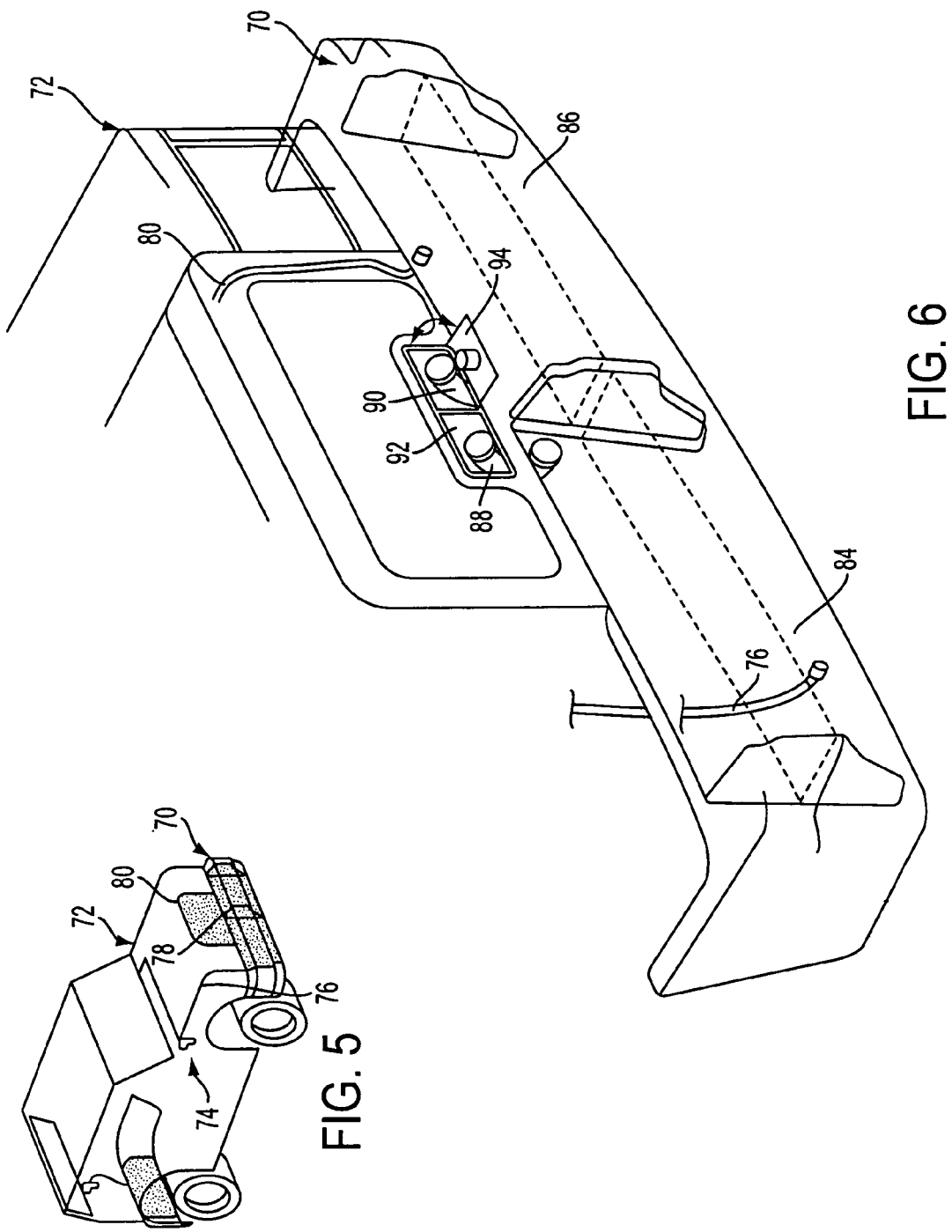

METHOD AND APPARATUS FOR BLOW MOLDING LARGE REINFORCED PLASTIC PARTS

GOVERNMENTAL SUPPORT AND INTEREST

The invention in this patent was made with Governmental support under Cooperative Agreement No. 70NANB7H3028 awarded to the Dow Chemical Company and Decoma International of America, Inc. (formerly Magna International of America, Inc.), project ID 1997-02-0047B, project name "NANOCOMPOSITES—NEW LOW COST/HIGH STRENGTH MATERIALS FOR AUTOMOTIVE PARTS," awarded Sep. 30, 1997 by the United States Department of Commerce, National Institute of Standards and Technology, Advanced Technology Program. The Government has certain rights in this invention.

This application is the National Phase of International Application No. PCT/US99/29991, filed Dec. 17, 1999, published as WO 00/37239, which claims priority from U.S. Provisional Patent Application Ser. No. 60/113,064, filed Dec. 21, 1998, the contents of all of which are incorporated herein by reference.

BACKGROUND OF THE INVENTION

The present invention relates to blow molding methods and apparatuses, and, more particularly, a blow molding method and apparatus for producing large, reinforced plastic parts.

Recently, there has been an increase in the demand and applications for large, molded plastic parts, specifically parts that are greater than about 2 lbs. in weight and having a total surface area of greater than about 400 sq. inches. As a result, some of these parts have become quite complex. One example of this can be seen in radiator supports for automobiles. Design engineers are now integrating many features into the radiator support to reduce tooling and manufacturing costs.

The usefulness of blow molding techniques for forming such parts has not been practical due to the structural characteristics of the plastic material conventionally used in blow molding techniques. That is, the ability to blow molding large complex parts is limited by the fact that the parts produced can be only so large or so thin before the parts lose their structural integrity and impact resistance.

Heretofore, in order to reinforce various large complex plastic parts, such parts would conventionally be reinforced by mineral fillers or glass fibers. However, such reinforcement cannot be used effectively in blow molding operations, because the glass fibers limit parison expansion characteristics and also have a deleterious effect on the blow molding assembly itself. Furthermore, such reinforcement has a deteriorating effect on impact resistance of the part.

SUMMARY OF THE INVENTION

It is an object of the present invention to overcome the problems noted above. In achieving this object, the present invention provides a method for blow molding large, plastic parts. Accordingly, the present invention provides a method for molding large parts, comprising the steps of providing a reinforced plastic melt comprising at least one thermoplastic material and reinforcement particles dispersed within the at least one thermoplastic material, the reinforcement particles comprising less than 15% of a total volume of the plastic melt, and at least 50% of the reinforcement particles having a thickness of less than about 20 nanometers, and at least 99% of the reinforcement particles having a thickness of less than about 30 nanometers; communicating a tubular formation of the plastic melt to a mold assembly having a mold cavity defined by mold surfaces, the mold surfaces corresponding to a configuration of the part to be molded, an amount of the plastic melt communicated to the mold assembly being sufficient to form a part having a weight of at least 2 pounds and a total surface area of at least 400 sq. inches; applying pressurized gas to an interior of said tubular formation to expand the tubular formation into conformity with the mold surfaces; solidifying the plastic melt to form the part; and removing said part from said mold assembly.

It is also an object of the invention to blow mold particular parts for automotive applications, which has heretofore been impractical.

In one embodiment, a substantially hollow, integrally formed radiator and light support structure for a motor vehicle is formed from at least one thermoplastic material and reinforcement particles dispersed within the at least one thermoplastic material. The reinforcement particles comprise less than 15% of a total volume of the integrally formed radiator and light support structure, at least 50% of the reinforcement particles have a thickness of less than about 20 nanometers, and at least 99% of the reinforcement particles have a thickness of less than about 30 nanometers. The structure comprises a radiator frame portion, having apertures for securing a motor vehicle radiator to the support structure. A pair of light receiving recesses of the support structure are constructed and arranged to mount headlights for the motor vehicle. The recesses have apertures for receiving electrical connecting portions of the lights.

In another embodiment, there is provided a hollow, sealed front end bumper that comprises at least one thermoplastic material and reinforcement particles dispersed within the at least one thermoplastic material. The reinforcement particles comprise less than 15% of a total volume of the bumper, at least 50% of the reinforcement particles have a thickness of less than about 20 nanometers, and at least 99% of the reinforcement particles having a thickness of less than about 30 nanometers. A fluid consuming component is constructed and arranged to be mounted on and used by the motor vehicle. A conduit communicates the fluid consuming component with the sealed interior of the hollow bumper, thus permitting said hollow sealed bumper to serve as a fluid reservoir for the fluid consuming component.

In another embodiment, there is provided a substantially hollow, integrally formed bumper and radiator and light support structure assembly for a motor vehicle. The assembly is formed from at least one thermoplastic material and reinforcement particles dispersed within the at least one thermoplastic material. The reinforcement particles comprise less than 15% of a total volume of the support structure assembly, at least 50% of the reinforcement particles have a thickness of less than about 20 nanometers, and at least 99% of the reinforcement particles have a thickness of less than about 30 nanometers. The integrally formed assembly includes i) a hollow radiator frame portion, and apertures formed in the frame portion for securing a motor vehicle radiator to the frame portion, ii) a pair of light receiving recesses constructed and arranged to mount for the motor vehicle. Apertures are formed in the recesses for connecting the lights with an electrical power source, and iii) a hollow bumper portion constructed and arranged to be mounted to a front end of a motor vehicle.

Other objects and advantages of the present invention will become apparent from the following detailed description.

BRIEF DESCRIPTION OF THE DRAWING

A preferred embodiment of the present invention is described herein with reference to the drawing wherein:

FIG. 5 is a perspective view of a motor vehicle, with certain components removed to better reveal others, and illustrating the combination of a hollow bumper, fluid consuming component, and conduit for communicating the bumper with the fluid consuming component in accordance with yet a further aspect of the present invention;

FIG. 6 is an enlarged perspective view of the front end of the motor vehicle illustrated in FIG. 5.

DESCRIPTION OF THE PREFERRED EMBODIMENT

Figure 1:
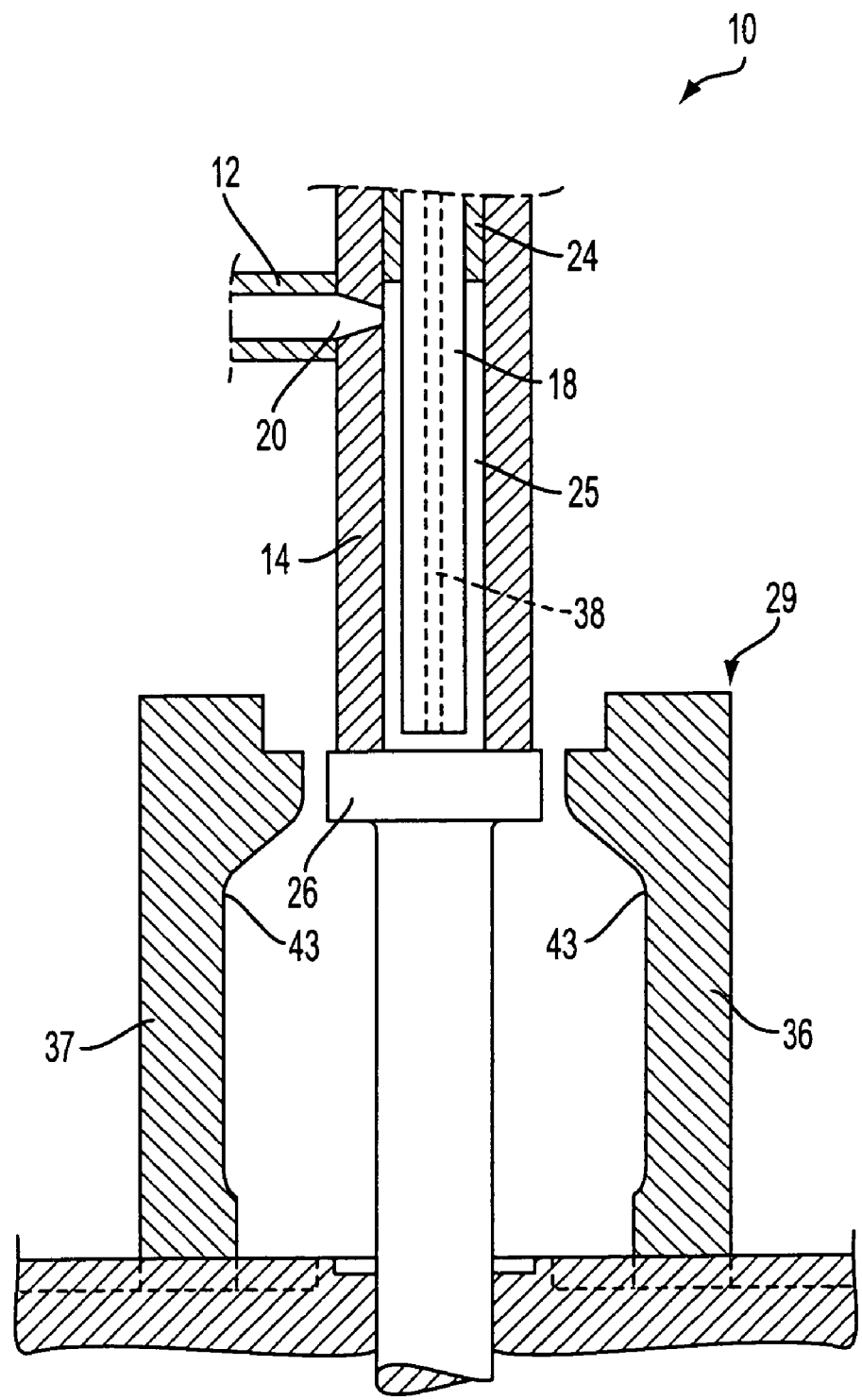
FIGS. 1–3 are cross sectional views of a blow molding assembly, and illustrating various steps used in a blow molding operation in accordance with one aspect of the present invention.

Illustrated in FIG. 1 is a blow molding assembly, generally indicated at 10, in accordance with the present invention. The assembly 10 includes an extruder nozzle 12 connected with a tubular head assembly 14. The tubular head assembly 14 is provided with an internal tubular core 18. An ejecting mechanism 24 is disposed in the space between the tubular head assembly 14 and the core 18.

Figure 2:
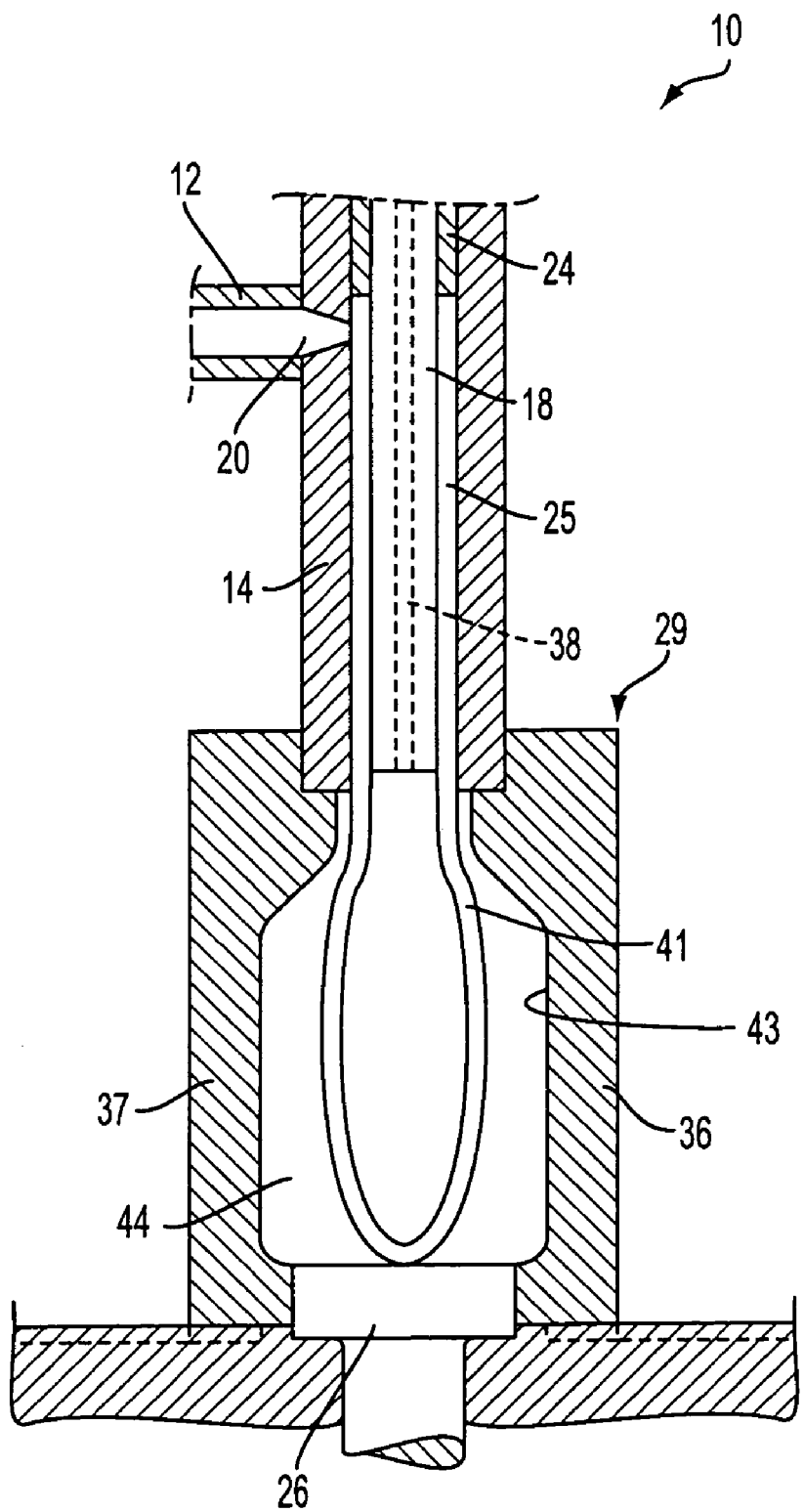
Figure 3:
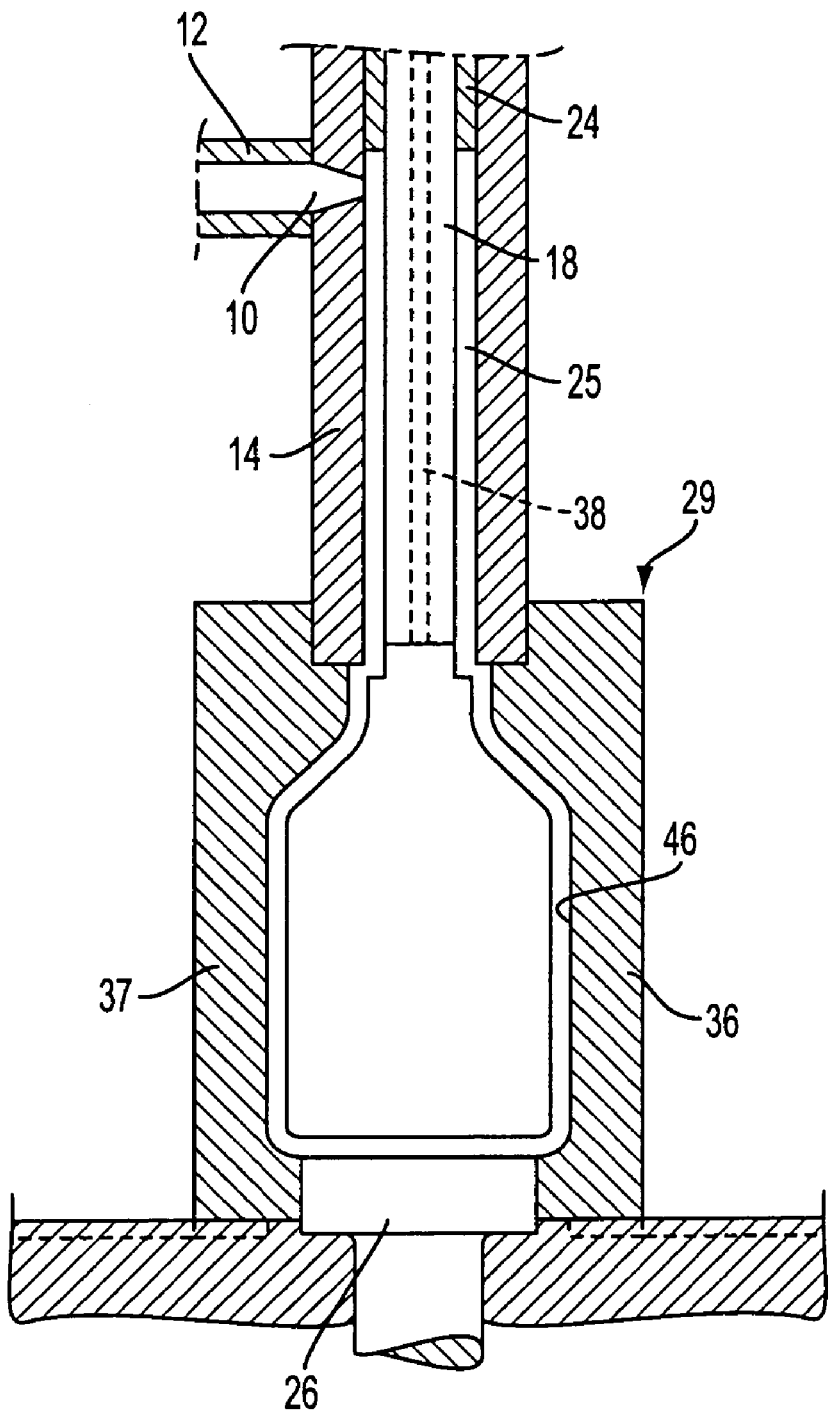

A hot plastic melt 20 is supplied through an extruder nozzle 12 into the tubular head assembly 14. A hot plastic preform 25 is produced in the cavity between the core 18 and the assembly 14. During this process the lower end of the head assembly 14 is firmly engaged by a movable base plate 26, constituting the upper portion of a hydraulic ram structure, for sealing the lower end of the cavity between core 18 and head assembly 14. The blow molding assembly further comprises a mold assembly 29, which has internal mold surfaces defining a die cavity. The die surfaces correspond to the external surface shape of the part to be blow molded. In the preferred embodiment, the mold assembly comprises parts capable of relative movement therebetween. More specifically, two mold parts 36 and 37 form side walls of the die cavity, and the base plate 26 forms the bottom wall when the base plate 26 is moved to its lowered position as illustrated in FIG. 2.

In operation, the mold assembly 29 starts in the open configuration, as shown in FIG. 1. The base plate 26 is pressed firmly against the head assembly 14 and closes the latter so that the preform 25 can be formed. The movable base plate 26 is then moved downwardly to drop a parison 41 of the hot plastic melt 20 (see FIG. 2). The ejecting ram mechanism 24 can be thrust forward to assist parison formation. At about the same speed as the preform 25 is ejected, the base plate 26 is lowered, while supporting the bottom of the tubular parison 41, and the second mold assembly 29 is closed. At the same time, compressed air or other gases or vapors under pressure are then blown through bore 38 in the core 18, so that the parison 41 is blown out and pressed firmly against the walls or surfaces 43 defining the cavity 44 of the mold assembly 29, the parison thus assuming the shape of the mold cavity. The amount of plastic melt 20 communicated in the form of tubular parison 41 to the mold assembly is sufficient to form a part having a weight of at least 2 pounds and a total surface area of at least 400 sq. inches, as the present invention is primarily concerned with larger parts of this magnitude. Smaller parts are not benefited vis-à-vis reinforcement to the same extent as larger parts (smaller parts usually do not require the same degree of structural integrity as larger parts).

Preferably, the mold assembly 29 is provided with appropriate water cooling lines and a temperature control unit in conventional fashion for regulating the temperature of the mold assembly.

After the part 46 has solidified, the mold assembly 29 is opened, and the part 46 is removed.

In accordance with the present invention, the plastic melt 20 (and thus the resultant part) comprises at least one thermoplastic material and reinforcement particles dispersed within the at least one thermoplastic material. The reinforcement particles comprise less than 15% of a total volume of the plastic melt 20, at least 50% of the reinforcement particles have a thickness of less than about 20 nanometers, and at least 99% of the reinforcement particles have a thickness of less than about 30 nanometers. In accordance with the method described above, a tubular formation in the form of parison 41 of the plastic melt is communicated to the mold assembly 29. The mold surfaces 43 correspond to a configuration of the part to be molded. Pressurized gas is applied through conduit or port 38 to an interior of the tubular formation 41 to expand the tubular formation into conformity with the mold surfaces 43. The plastic melt when forced into conformity with surfaces 43 is then permitted to solidify (e.g, by cooling the mold assembly 29) to form the part 46. The solidified part is then removed from the mold assembly 29 and after the mold assembly 29 is opened.

The reinforcement filler particles, also referred to as "nanoparticles" due to the magnitude of their dimensions, each comprise one or more generally flat platelets. Each platelet has a thickness of between 0.7–1.2 nanometers. Generally, the average platelet thickness is approximately 1 nanometer thick. The aspect ratio (which is the largest dimension divided by the thickness) for each particle is about 50 to about 300.

The platelet particles or nanoparticles are derivable from larger layered mineral particles. Any layered mineral capable of being intercalated may be employed in the present invention. Layered silicate minerals are preferred. The layered silicate minerals that may be employed include natural and artificial minerals. Non-limiting examples of more preferred minerals include montmorillonite, vermiculite, hectorite, saponite, hydrotalcites, kanemite, sodium octosilicate, magadite, and kenyaite. Mixed Mg and Al hydroxides may also be used. Among the most preferred minerals is montmorillonite.

To exfoliate the larger mineral particles into their constituent layers, different methods may be employed. For example, swellable layered minerals, such as montmorillonite and saponite are known to intercalate water to expand the inter layer distance of the layered mineral, thereby facilitating exfoliation and dispersion of the layers uniformly in water. Dispersion of layers in water is aided by mixing with high shear. The mineral particles may also be exfoliated by a shearing process in which the mineral particles are impregnated with water, then frozen, and then dried. The freeze dried particles are then mixed into molten polymeric material and subjected to a high sheer mixing operation so as to peel individual platelets from multi-platelet particles and thereby reduce the particle sizes to the desired range.

The plastic melt 20 utilized in accordance with the present invention are prepared by combining the platelet mineral with the desired polymer in the desired ratios. The components can be blended by general techniques known to those skilled in the art. For example, the components can be blended and then melted in mixers or extruders. Preferably, the plastic melt 20 is first manufactured into pellet form. Then pellets are then plasticized in the extruder 1 to form the plastic melt 20.

Additional specific preferred methods, for the purposes of the present invention, for forming a polymer composite having dispersed therein exfoliated layered particles are disclosed in U.S. Pat. Nos. 5,717,000, 5,747,560, 5,698,624, and WO 93/11190, each of which is hereby incorporated by reference. For additional background, the following are also incorporated by reference: U.S. Pat. Nos. 4,739,007 and 5,652,284.

Preferably, the thermoplastic used for the purposes of the present invention is a polyolefin or a blend of polyolefins. The preferred polyolefin is at least one member selected from the group consisting of polypropylene, ethylene-propylene copolymers, thermoplastic olefins (TPOs), and thermoplastic polyolefin elastomers (TPEs).

The exfoliation of layered mineral particles into constituent layers need not be complete in order to achieve the objects of the present invention. The present invention contemplates that at least 50% of the particles should be less than about 20 nanometers in thickness and, thus, at least 50% of the particles should be less than about 20 platelets stacked upon one another in the thickness direction. In addition, at least 99% of the reinforcement particles should have a thickness of less than about 30 nanometers. With this extent of exfoliation, with a loading of less than 15% by volume, the benefits of the nanoparticles begin to accrue with meaningful effect for many large thin part applications. For example, such loading of nanoparticles will provide a desired increase in the modulus of elasticity by about 50–70% over conventional fillers.

More preferably, at least 50% of the particles should have a thickness of less than 10 nanometers. At this level, an additional increase of about 50–70% in the modulus of elasticity is achieved in comparison with the 50% of particles being less than 20 nanometer thick as discussed above. This provides a level of reinforcement and impact resistance that would be highly suitable for most motor vehicle bumper applications.

Preferably, at least 70% of the particles should have a thickness of less than 5 nanometers, which would achieve an additional 50–70% increase in the modulus of elasticity in comparison with the 50% of less than 10 nanometer thickness exfoliation discussed above. This provides ideal reinforcement and impact resistance for large thin parts that must withstand greater degrees of impart. It is always preferable for at least 99% of the particles to a thickness of less than about 30 nanometers (i.e., less than about 30 layers or platelets thick), as particles greater than this size act as stress concentrators.

It is most preferable to have as many particles as possible to be as small as possible, ideally including only a single platelet.

As noted above, the preferred aspect ratio (which is the largest dimension divided by the thickness) for each particle is about 50 to about 300. At least 80% of the particles should be within this range. If too many particles have an aspect ratio above 300, the material becomes too viscous for forming parts in an effective and efficient manner. If too many particles have an aspect ratio of smaller than 50, the particle reinforcements will not provide the desired reinforcement characteristics. More preferably, the aspect ratio for each particle is between 100–200. Most preferably, at least 90% of the particles have an aspect ratio within the 100–200 range.

Generally, in accordance with the present invention, the plastic melt 20 and hence the parts to be manufactured should contain less than 15% by volume of the reinforcement particles of the type contemplated herein. The balance of the part is to comprise an appropriate polyolefin material and suitable additives. If greater than 15% by volume of reinforcement filler is used, the viscosity of the composition becomes too high and thus difficult to mold.

Figure 4:
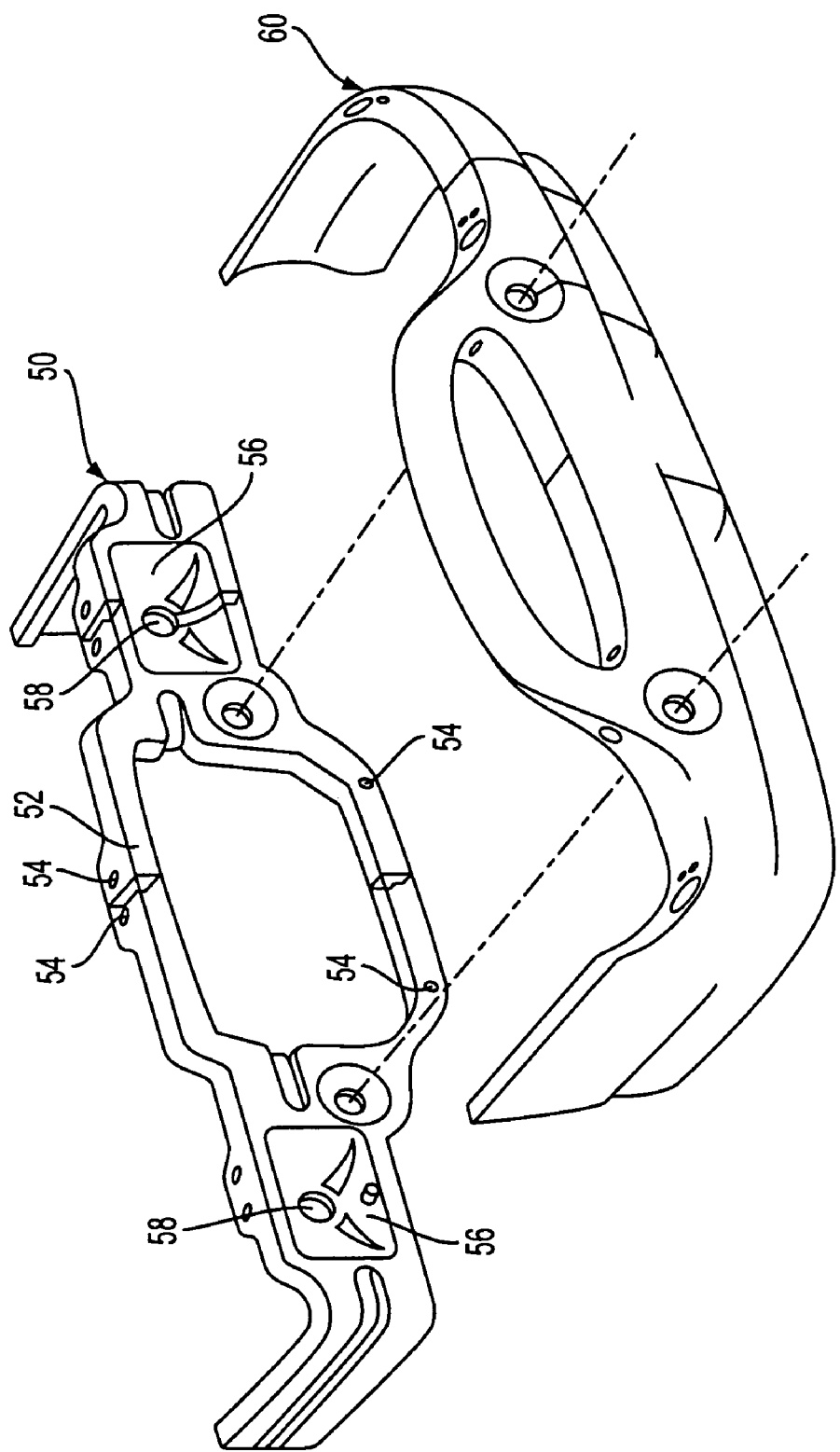
FIG. 4 is a perspective view of a blow-molded combination radiator support and light support structure in accordance with a further aspect of the present invention.

Turning now to FIG. 4, there is shown a substantially hollow, integrally formed radiator and light support structure for a motor vehicle, generally indicated at 50, and manufactured in a blow molding operation in accordance with the present invention. The structure 50 is formed from at least one thermoplastic material and reinforcement particles dispersed within the at least one thermoplastic material. The reinforcement particles comprise less than 15% of a total volume of the integrally formed radiator and light support structure 50, at least 50% of the reinforcement particles have a thickness of less than about 20 nanometers, and at least 99% of the reinforcement particles have a thickness of less than about 30 nanometers. The structure 50 comprises a radiator frame portion 52, having apertures 54 for securing a motor vehicle radiator (not shown for sake of clarity) to the support structure 50. A pair of light receiving recesses 56 of the support structure 50 are constructed and arranged to mount headlights (not shown for sake of clarity) for the motor vehicle. The recesses 56 having apertures 58 for receiving electrical connecting portions of the lights.

As shown, the support structure can be nestingly received with respect to a motor vehicle fascia, indicated at 60.

In accordance with another embodiment of the invention, the apertures 54 in the radiator frame portion 52 are formed after the structure 50 is removed from the mold assembly.

Turning now to FIGS. 5 and 6, there is shown a hollow, sealed front end bumper, generally indicated at 70. The bumper 70 is shown mounted to the front end of a motor vehicle, generally indicated at 72. The hollow bumper comprises at least one thermoplastic material and reinforcement particles dispersed within the at least one thermoplastic material. The reinforcement particles comprise less than 15% of a total volume of the bumper, at least 50% of the reinforcement particles have a thickness of less than about 20 nanometers, and at least 99% of the reinforcement particles have a thickness of less than about 30 nanometers. A fluid consuming component, such as a conventional windshield wiper fluid spraying assembly, generally indicated at 74 in FIG. 5, is constructed and arranged to be mounted on and used by the motor vehicle. A conduit 76 communicates the fluid consuming component with the sealed interior of the hollow bumper 70, thus permitting said hollow sealed bumper to serve as a fluid reservoir for the fluid consuming component (e.g., the wiper fluid spraying assembly 74).

The fluid consuming component to which the bumper 70 is communicated may be other components in the motor vehicle as well, such as the radiator 78, which may be communicated with the interior of the bumper 70 by conduit 80 (see FIG. 5).

It should also be appreciated that the bumper 70 may be divided so as to have two separate compartments. For example, in FIG. 6 it can be appreciated that the interior of bumper 70 is divided into compartments 84 and 86, with the compartment 84 communicating with the wiper spray assembly 74 via conduit 76, and the compartment 86 communicating with radiator 78 via conduit 80. Separate compartment filler necks 88 and 90 are provided for filling compartments 84 and 86, respectively, with the appropriate fluids. Doors 92 and 94 are pivotally mounted close off access to necks 88 and 90, respectively, and to permit access to the necks when filling is desired.

Figure 7:
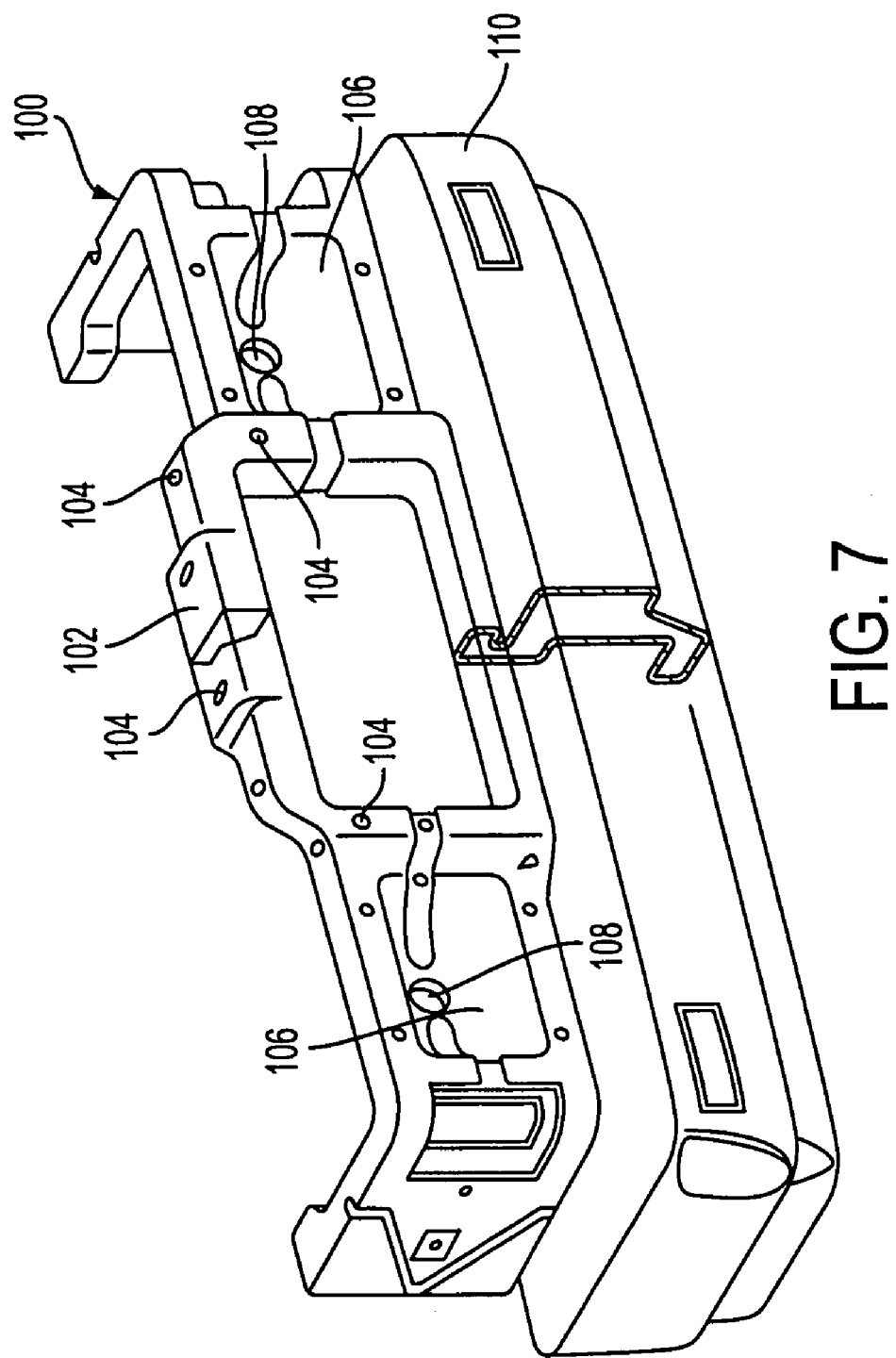
FIG. 7 is a perspective view of an integral, blow-molded bumper and radiator support and headlight support assembly in accordance with yet another aspect of the present invention.

Turning now to FIG. 7, there is shown a substantially hollow, integrally formed bumper and radiator and light support structure assembly for a motor vehicle, generally indicated at 100. The assembly 100 is formed from at least one thermoplastic material and reinforcement particles dispersed within the at least one thermoplastic material. The reinforcement particles comprise less than 15% of a total volume of the support structure assembly, at least 50% of the reinforcement particles have a thickness of less than about 20 nanometers, and at least 99% of the reinforcement particles having a thickness of less than about 30 nanometers. The integrally formed assembly includes i) a hollow radiator frame portion 102, and apertures 104 formed in the frame portion for securing a motor vehicle radiator (not shown for sake of clarity) to the frame portion 102, ii) a pair of light receiving recesses 106 constructed and arranged to mount lights (not shown for sake of clarity of illustration) for the motor vehicle. Apertures 108 are formed in the recesses 106 for connecting the lights with an electrical power source, and iii) a hollow bumper portion 110 constructed and arranged to be mounted to a front end of a motor vehicle.

By utilizing plastic melt with the loading of nanoparticles discussed above (e.g., less than 15% of a total volume of the plastic melt), higher modulus of elasticity of conventional large plastic parts can be achieved, and thus be manufactured with a reduced wall thickness while maintaining the same required impact resistance. In one example, the modulus of the material used to form a bumper is increased to between about 200,000 to about 500,000 PSI.

In accordance with the present invention, by adding the exfoliated platelet material in accordance with the above, the modulus of the large, thin part can be increased without significantly losing impact resistance. Because the modulus is increased, large thin parts, such as bumpers, can be made thinner than what was otherwise possible. More specifically, bumpers for automobiles must have sufficient impact resistance or toughness to withstand various standard automotive impact tests.

For example, an automotive bumper must withstand a typical dart (puncture type) impact test wherein the bumper will not crack or permanently deform upon impact of at least 200 inch pounds force at a temperature of −30° C. or lower. In a conventional IZOD impact test, it is desirable for the bumper to withstand at least 10 ft pounds/inch at room temperature and at least 5 ft pounds/inch at −30° C. In order to withstand cracking at such force levels, the modulus for the conventional bumper is typically between about 70,000 to about 150,000 pounds per square inch. (PSI). In accordance with the present invention, the modulus can be increased by a factor of 2 to 3 times, without significantly effecting the impact resistance.

In addition to the above mentioned benefits, use of the nanoparticle reinforced plastic melt enables the coefficient of linear thermal expansion to be reduced to less than 40×10−6 inches of expansion per inch of material per degree Fahrenheit (IN/IN)/° F., which is less than 60% of what was previously achievable for thermoplastic motor vehicle bumpers that meet the required impact tests. As a further benefit, the surface toughness of the bumper can be improved. The improved surface toughness provided by the nanoparticles greatly reduces handling damage and part scrap. It also eliminates the need for the extra packaging and protective materials and the labor involved.

In addition, it is possible to double the modulus of polymers without significantly reducing toughness. Thus, it is possible to produce parts like bumpers using 20–35% thinner wall sections that will have comparable performance. The use of nanoparticles can provide the mechanical, thermal, and dimensional property enhancements, which are typically obtained by adding 20–50% by weight of glass fibers or mineral fillers or combinations thereof to polymers. However, only a few percent of nanoparticles are required to obtain these property enhancements.

As a result of the fact that such low levels of nanoparticles are required to obtain the requisite mechanical properties, many of the typical negative effects of the high loadings of conventional reinforcements and fillers are avoided or significantly reduced. These advantages include: lower specific gravity for a given level of performance, better surface appearance, toughness close to that of the unreinforced base polymer, and reduced anisotropy in the molded parts.

It is preferable for these parts to have reinforcement particles of the type described herein comprising about 2–10% of the total volume of the panel, with the balance comprising the polyolefin substrate. It is even more preferable for these exterior panels to have reinforcement particles of the type contemplated herein comprising about 3%–5% of the total volume of the panel.

In accordance with another specific embodiment of the present invention, it is contemplated that the blow molding apparatus can be used to make large, highly reinforced parts having a modulus of elasticity of 1,000,000 or greater. Conventionally, these parts typically require loadings of 25–40% by volume of glass fiber reinforcement. This amount of glass fiber loading would result in a high viscosity of any melt pool that could be used in the blow molding apparatus of the present invention and would thus render the blow molding apparatus disclosed herein largely impractical for such application.

Use of the plastic melt 20 as described above enables the blow molding apparatus disclosed herein to manufacture large parts that can be provided with impact resistance characteristics that were not previously attainable. For example, the blow molding system of the present invention is able to manufacture large parts having a modulus of elasticity of greater than 1,000,000 PSI by use of the plastic melt reinforced with loadings of 8–15% by volume of nanoparticles, with at least 70% of the nanoparticles having a thickness of 10 nanometers or less. As with the above described embodiment, the plastic melt used has substantially the same material composition as the part to be manufactured.

In this case of molding large parts with a modulus of elasticity greater than 1,000,000 PSI, it may be desirable to use engineering resins instead of polyolefins. Such engineering resins may include polycarbonate (PC), acrylonitrile butadiene styrene (ABS), a PC/ABS blend, polyethylene terephthalates (PET), polybutylene terephthalates (PBT), polyphenylene oxide (PPO), or the like. Generally, these materials in an unreinforced state have a modulus of elasticity of about 300,000 PSI–350,000 PSI. At these higher loadings of nanoparticles (8–15% by volume), impact resistance will be decreased, but to a much lower extent than the addition of the conventional 25–40% by volume of glass fibers.

Although certain embodiments of the invention have been described and illustrated herein, it will be readily apparent to those of ordinary skill in the art that a number of modifications and substitutions can be made to the blow molding system disclosed and described herein without departing from the true spirit and scope of the invention.

What is claimed is:

1. A method for blow molding a large part, comprising the steps of:
    providing a reinforced plastic melt comprising at least one thermoplastic material and reinforcement particles dispersed within the at least one thermoplastic material, the reinforcement particles comprising less than 15% of a total volume of the plastic melt, at least 50% of the reinforcement particles having a thickness of less than about 20 nanometers, and at least 99% of the reinforcement particles having a thickness of less than about 30 nanometers;
    communicating a tubular formation of said plastic melt to a mold assembly having a mold cavity defined by mold surfaces, said mold surfaces corresponding to a configuration of the part to be molded, an amount of said plastic melt communicated to said mold assembly being sufficient to form a part having a weight of at least 2 pounds and a total surface area of at least 400 sq. inches;
    applying pressurized gas to an interior of said tubular formation to expand said tubular formation into conformity with said mold surfaces;
    solidifying said plastic melt to form said part; and
    removing said part from said mold assembly.

2. A method according to claim 1, wherein said part comprises a substantially hollow, integrally formed radiator and light support structure for a motor vehicle, said method including:
    forming a radiator frame portion of said support structure, and forming apertures in said frame portion for securing a motor vehicle radiator to said support structure,
    forming a pair of light receiving recesses of said support structure constructed and arranged to mount lights for said motor vehicle, and forming apertures in said recesses for securing said lights to said support structure.

3. A method according to claim 2, wherein said lights comprise headlights.

4. A method according to claim 3, wherein said support structure further includes another pair of recesses constructed and arranged to mount parking lights therein.

5. A method according to claim 2, wherein said forming of said apertures in said frame portion is accomplished after said part is removed from said mold assembly.

6. A method according to claim 2, wherein said forming of said apertures in said recesses is accomplished after said part is removed from said mold assembly.

7. A method according to claim 2, further comprising:
    providing a front fascia for a motor vehicle;
    nestingly disposing said support structure with respect to said front fascia.

8. A method according to claim 1, wherein said part comprises a substantially hollow, bumper for a motor vehicle, said method further comprising:
    mounting said bumper to an exterior of the motor vehicle at an end of the motor vehicle;
    communicating an interior of said bumper to a fluid consuming component of the motor vehicle; and
    filling said bumper with fluid to enable said bumper to serve as a fluid reservoir for said fluid consuming component.

9. A method according to claim 8, further comprising providing said bumper with a port for receiving said fluid.

10. A method according to claim 8, wherein said component comprises a windshield wiper fluid spraying assembly.

11. A method according to claim 10, wherein said component comprises a radiator.

12. A method according to claim 10, wherein said bumper comprises two compartments, wherein a first of said compartments is communicated with said windshield wiper spraying assembly, and wherein a second of said compartments is communicated with a radiator.

13. A method for blow molding large parts, comprising the steps of:
    providing a reinforced plastic melt comprising at least one thermoplastic material and reinforcement particles dispersed within the at least one thermoplastic material, the reinforcement particles comprising less than 15% of a total volume of the plastic melt, at least 50% of the reinforcement particles having a thickness of less than about 20 nanometers, and at least 99% of the reinforcement particles having a thickness of less than about 30 nanometers;
    communicating a tubular formation of said plastic melt to a mold assembly having a mold cavity defined by mold surfaces, said mold surfaces corresponding to a configuration of the part to be molded, an amount of said plastic melt communicated to said mold assembly being sufficient to form a part having a weight of at least 2 pounds and a total surface area of at least 400 sq. inches;
    applying pressurized gas to an interior of said tubular formation to expand said tubular formation into conformity with said mold surfaces;
    solidifying said plastic melt to form said part; and
    removing said part from said mold assembly,
    said part comprising a substantially hollow, integrally formed bumper and radiator and light support structure assembly for a motor vehicle, said method including:
    forming a radiator frame portion of said integrally formed assembly, and forming apertures in said frame portion for securing a motor vehicle radiator to said support structure,
    forming a pair of light receiving recesses of said integrally formed assembly constructed and arranged to mount lights for said motor vehicle, and forming apertures in said recesses for securing said lights to said support structure; and
    forming a bumper portion of said integrally formed assembly; and
    mounting said assembly on the front end of the motor vehicle.

14. A method for blow molding large parts, comprising the steps of:
    providing a reinforced plastic melt comprising at least one thermoplastic material and reinforcement particles dispersed within the at least one thermoplastic material, the reinforcement particles comprising less than 15% of a total volume of the plastic melt, at least 50% of the reinforcement particles having a thickness of less than about 20 nanometers, and at least 99% of the reinforcement particles having a thickness of less than about 30 nanometers;

communicating a tubular formation of said plastic melt to a mold assembly having a mold cavity defined by mold surfaces, said mold surfaces corresponding to a configuration of the part to be molded, an amount of said plastic melt communicated to said mold assembly being sufficient to form a part having a weight of at least 2 pounds and a total surface area of at least 400 sq. inches;

applying pressurized gas to an interior of said tubular formation to expand said tubular formation into conformity with said mold surfaces;

solidifying said plastic melt to form said part; and removing said part from said mold assembly, said part comprising a substantially hollow, integrally formed radiator and light support structure for a motor vehicle, said method including:

forming a radiator frame portion of said support structure, and forming apertures in said frame portion for securing a motor vehicle radiator to said support structure, forming a pair of light receiving recesses of said support structure constructed and arranged to mount lights for said motor vehicle, and forming apertures in said recesses for securing said lights to said support structure.

15. A method according to claim 14, wherein said lights comprise headlights.

16. A method according to claim 15, wherein said support structure further includes another pair of recesses constructed and arranged to mount parking lights therein.

17. A method according to claim 14, wherein said forming of said apertures in said frame portion is accomplished after said part is removed from said mold assembly.

18. A method according to claim 14, wherein said forming of said apertures in said recesses is accomplished after said part is removed from said mold assembly.

19. A method according to claim 14, further comprising:
providing a front fascia for a motor vehicle;
nestingly disposing said support structure with respect to said front fascia.

20. A method for blow molding large parts, comprising the steps of:

providing a reinforced plastic melt comprising at least one thermoplastic material and reinforcement particles dispersed within the at least one thermoplastic material, the reinforcement particles comprising less than 15% of a total volume of the plastic melt, at least 50% of the reinforcement particles having a thickness of less than about 20 nanometers, and at least 99% of the reinforcement particles having a thickness of less than about 30 nanometers;

communicating a tubular formation of said plastic melt to a mold assembly having a mold cavity defined by mold surfaces, said mold surfaces corresponding to a configuration of the part to be molded, an amount of said plastic melt communicated to said mold assembly being sufficient to form a part having a weight of at least 2 pounds and a total surface area of at least 400 sq. inches;

applying pressurized gas to an interior of said tubular formation to expand said tubular formation into conformity with said mold surfaces;

solidifying said plastic melt to form said part; and removing said part from said mold assembly, said part comprising a substantially hollow bumper for a motor vehicle, said method further comprising:

mounting said bumper to an exterior of the motor vehicle at an end of the motor vehicle;

communicating an interior of said bumper to a fluid consuming component of the motor vehicle; and filling said bumper with fluid to enable said bumper to serve as a fluid reservoir for said fluid consuming component.

21. A method according to claim 20, further comprising provided said bumper with a port for receiving said fluid.

22. A method according to claim 20, wherein said component comprises a windshield wiper fluid spraying assembly.

23. A method according to claim 23, wherein said component comprises a radiator.

24. A method according to claim 22, wherein said bumper comprises two compartments, wherein a first of said compartments is communicated with said windshield wiper spraying assembly, and wherein a second of said compartments is communicated with a radiator.

* * * * *